(12) United States Patent
Quiles et al.

(10) Patent No.: US 7,065,072 B1
(45) Date of Patent: Jun. 20, 2006

(54) METHOD AND SYSTEM FOR PROVIDING TELECOMMUNICATION SERVICES BY A PLURALITY OF SERVICE PROVIDERS

(75) Inventors: William Quiles, Pflugerville, TX (US); Bhuvan A. Sur, Elliott City, MD (US); Ronald L. Franzen, Jr., Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 10/035,392

(22) Filed: Dec. 28, 2001

(51) Int. Cl.
   *H04L 12/64* (2006.01)
(52) U.S. Cl. ...................... 370/352; 370/493
(58) Field of Classification Search ............. 370/493, 370/494, 495, 352, 354
   See application file for complete search history.

(56) References Cited

U.S. PATENT DOCUMENTS

| | | | |
|---|---|---|---|
| 6,459,702 B1 | 10/2002 | Saaverda et al. | 370/422 |
| 6,463,079 B1 | 10/2002 | Sundaresan et al. | 370/468 |
| 6,584,148 B1 | 6/2003 | Zitting et al. | 375/222 |
| 6,639,913 B1 | 10/2003 | Frankel et al. | 370/356 |
| 6,798,866 B1 | 9/2004 | Tennyson et al. | 379/1.03 |
| 6,845,248 B1 * | 1/2005 | Johnson | 455/554.2 |
| 6,873,628 B1 * | 3/2005 | Tang | 370/480 |
| 6,888,834 B1 * | 5/2005 | Wood et al. | 370/395.41 |
| 6,891,825 B1 | 5/2005 | O'Dell et al. | 370/352 |
| 2002/0009099 A1 | 1/2002 | D'Onofrio | 370/467 |
| 2002/0101851 A1 | 8/2002 | Blake, Jr. et al. | 370/352 |
| 2002/0101881 A1 | 8/2002 | Sundaresan et al. | 370/468 |
| 2002/0152326 A1 | 10/2002 | Orshan | 709/249 |
| 2003/0099239 A1 * | 5/2003 | Kim | 370/395.1 |
| 2004/0128139 A1 | 7/2004 | Ilan et al. | 704/275 |

* cited by examiner

*Primary Examiner*—Melvin Marcelo
(74) *Attorney, Agent, or Firm*—Baker Botts L.L.P.

(57) ABSTRACT

According to one embodiment of the invention, a method for providing communications services includes providing a digital subscriber line access multiplexer having a plurality of line cards. Each line card has one or more ports. The method also includes granting control of a first subset of the ports to a first service provider and granting control of a second subset of the ports to a second service provider.

19 Claims, 2 Drawing Sheets

METHOD AND SYSTEM FOR PROVIDING TELECOMMUNICATION SERVICES BY A PLURALITY OF SERVICE PROVIDERS

TECHNICAL FIELD OF THE INVENTION

This invention relates generally to communications and more particularly a method and system for providing telecommunications services by a plurality of service providers.

BACKGROUND OF THE INVENTION

Communications is becoming increasingly important in today's society. The increased use of the Internet has greatly increased demand for high bandwidth services for homes and businesses. One approach at addressing this desired demand for bandwidth is the use of digital subscriber line (DSL) technology. Digital subscriber line technology utilizes available frequency ranges associated with conventional telephone wires that are not traditionally used for telephone service.

Both DSL and conventional telephone service typically utilize a central office. At the central office, communications signals received from persons connected to the central office are switched for transmission to more remote points. Such signals may be associated with the DSL transmissions, in which case the signals are transmitted to a network, such as the Internet, or with plain old telephone service (POTS), in which case the communications signal is switched appropriately to the called number. This may involve long distance lines.

The telephone lines originating at a person's home and leading to the central office are sometimes referred to as the local loop. Traditionally, one service provider operates the central office and the local loop and all customers receiving service from that central office were customers of that company. In response to the Telecommunications Act of 1996, access to the central office and the local loop was made available to competitors of the service provider controlling the central office and the local loop. Conventionally, this involves leasing the local loop lines to the competitors. The owner of the central office is often referred to as the incumbent local exchange carrier (ILEC) and its competitors operating within that central office are referred to as a competitive local exchange carrier (CLEC).

In response to the opening of the local loop, numerous service providers have begun providing DSL service to homes or businesses connected to the local loop, rather than a sole service provider providing such service. To do so, the ILEC provides a telephone wire connection associated with a given user at the central office to the CLEC. The CLEC then connects these wires to a digital subscriber line access multiplexer (DSLAM) A DSLAM receives communications over a telephone line, converts it into a appropriate digital format for transmission on the Internet, and performs necessary switching to route the converted signal onto the Internet. Conventionally, a DSLAM comprises a plurality of line cards and a network interface. Each line card comprises one or more modems or ports that directly connect to the telephone lines. The network interface interfaces with a network to which communication is desired, and each line card is coupled to the network interface.

Conventionally, each service provider's DSLAM is under-utilized because the DSLAM can conventionally accommodate more customers than any one CLEC has in a given central office. This causes unneeded expense.

SUMMARY OF THE INVENTION

According to one embodiment of the invention, a method for providing communications services includes providing a digital subscriber line access multiplexer (DSLAM) having a plurality of line cards. Each line card has one or more ports. The method also includes granting control of a first subset of the ports to a first service provider and granting control of a second subset of the ports to a second service provider.

Some embodiments of the invention provide numerous technical advantages. Some embodiments may benefit from some, none or all of the below-described advantages. For example, according to one embodiment of the invention, a plurality of service providers may share a single DSLAM in a central office. Such sharing is economical because many service providers do not have enough customers to warrant a full DSLAM. Furthermore, space in the central office is generally at a premium, and such sharing allows such scarce space to be utilized for other purposes. Such a system allows for, in some embodiments, easy upgrading of ports because the incumbent local exchange carrier does not need be contacted for any upgrades. Rather, only the service provider associated with a particular customer needs be contacted. In some embodiments, Layer 1 access to a DSLAM is provided to more than one service provider.

Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF EXAMPLE EMBODIMENTS OF THE INVENTION

Example embodiments of the invention are best understood by referring to FIGS. 1 through 4 of the drawings, like numerals being used for like and corresponding parts of the various drawings.

Figure 1:
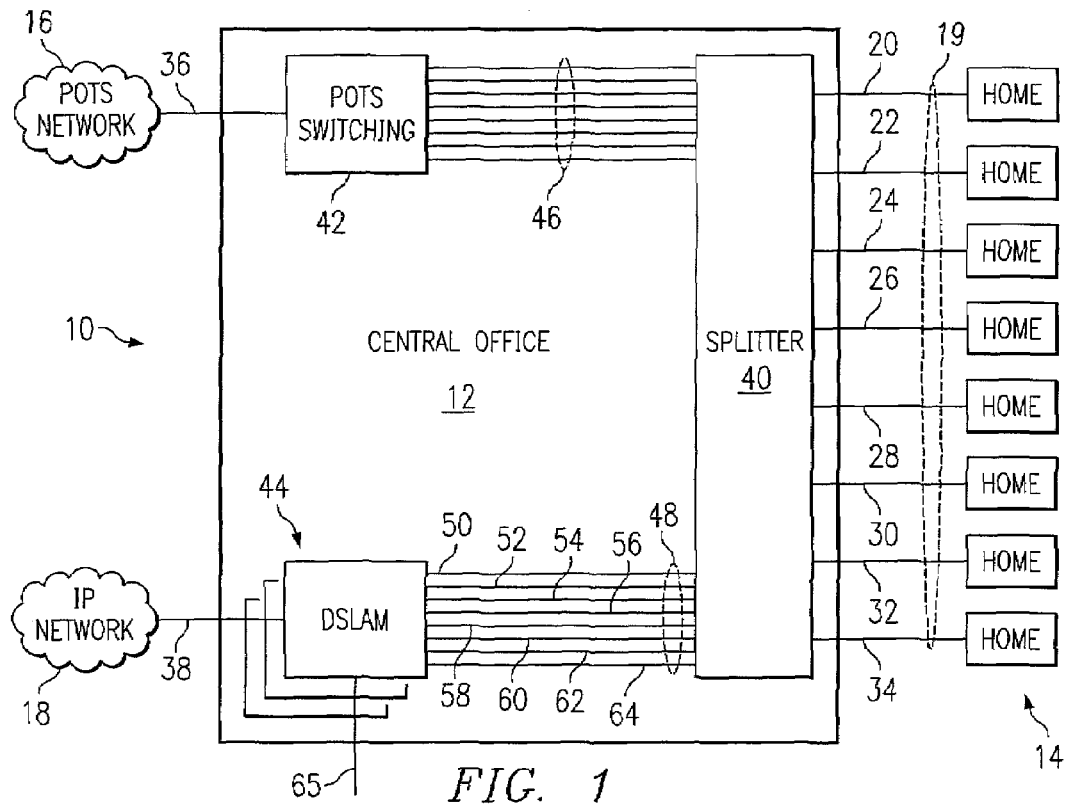
FIG. 1, is a block diagram of a communications system according to the teachings of the invention.

FIG. 1 is a block diagram of a telecommunication system 10 according to the teachings of the invention. Telecommunication system 10 includes a central office 12 providing telecommunications services between a plurality of homes or businesses (or other locations) 14 (referred to herein as "homes 14") and a plain old telephone service (POTS) network 16 or an Internet protocol network 18. Central office 12 receives a plurality of telephone lines 19 coupled to respective ones of homes 14. Telephone lines 19 comprise telephone lines 20, 22, 24, 26, 28, 30, 32 and 34. POTS network 16 is coupled to central office 12 through one or more telephone lines 36. Telephone lines 36 are often referred to long distance lines because they connect a central office to more remote locations; however, telephone lines 36 may couple central office 12 to another central office or other component of a telephone network that does not require long distance communication. IP network 18 couples to central office 12 through communication line 38. Communication line 38 may be any suitable communication link that may carry Internet protocol traffic, including OC3, DSC, T1 (STM1, E3, E1, in Europe). Central office 12 may also couple to networks of types other than POTS or IP through suitable communications links.

Central office 12 comprises a splitter 40, a switch 42 associated with POTS switching, and a DSLAM 44. Splitter 40 receives signals over telephone lines 19 and splits them into respective DSL signals and POTS signals. POTS switch 42 receives plain old telephone service signals from splitter 40 and appropriately switches them for receipt by an appropriate destination within POTS network 16. DSLAM 44 receives DSL signals from splitter 40 and controls communication of those signals to IP network 18. Such control may involve multiplexing a plurality of signals received by DSLAM 14 for transmission over communication line 38.

As illustrated, a central office may comprise a plurality of DSLAMs 44. Each DSLAM 44 may have its own Internet protocol address. DSLAM 44 receives and transmits configuration data over line 65, as described in greater detail below. DSLAM 44 is described in greater detail below in conjunction with FIG. 2.

POTS switch 42 is coupled to splitter 40 by a plurality of lines 46. DSLAM 44 is coupled to splitter 40 by a plurality of lines 48. In one embodiment, a one-to-one correspondence exists between lines 48 and lines 19 as well as a one-to-one correspondence between lines 46 and plurality of lines 18. Communications lines 48 comprise a line 50, 52, 54, 56, 58, 62, and 64.

In operation, a home 14 transmits a voice signal to central office 12, where it is received at splitter 40 and communicated to POTS switch 42 over one of lines 46. Line 46 examines the intended destination for the call and appropriately directs it to the intended destination over POTS network 16. Conversely, a phone call placed within POTS network 16 is received by POTS switch 42 and is directed to the appropriate home 14 through splitter 40. In this instance of a phone call received from POTS network 16, splitter 40 does not split any communication signal but rather couples a respective one of the plurality of lines 46 to an associate respective one of the plurality of lines 19 associated with the home 14 to which the call was placed.

If home 14 wishes to communicate using DSL technology, a corresponding signal is received from home 14 over one of lines 19 at splitter 40, where it is communicated to DSLAM 44 over a respective one of lines 48. DSLAM 44 receives the signal, conditions it for receipt by IP network 18, and appropriately multiplexes the signal for communication on line 38 through IP network 18. Conversely, an Internet protocol signal originating within IP network 18 may be transmitted to a selected home 14 through DSLAM 44. In such a case, DSLAM 44 receives the signal, conditions it, and communicates it over an appropriate one of lines 48 through splitter 40 to an appropriate home 14 over a respective line 19.

Lines 19, 46, and 48 are all telephone lines associated with what is referred to as the "local loop." Conventionally, only one entity was allowed access to the local loop. However, in response to the Telecommunications Act of 1996, the owner of central office 12, now referred to as an incumbent local exchange carrier (ILEC), was required to make the local loop available to competitors. The competitors are referred to as competitive local exchange carriers (CLECs). This allowed competing long distance companies, such as companies that offer long distance services within POTS network 16, to terminate calls to homes 14 on the local loop as well as receive calls from the local loop. In making the local loop available to CLECs, the ILEC conventionally would provide access to telephone lines 19 associated with any home 14 that receives service from the ILEC. In cases where a home used one service provider for voice service and one for data service, two lines 19 were conventionally provided to that home. This consisted of two copper pairs, with one pair going to each of the service providers. The CLECs would then connect such copper wires to their own combination of DSLAMs, POTS switch, and splitter. This approach is wasteful, particularly with respect to the use of multiple DSLAMS, because a CLEC conventionally does not have enough customers to fully utilize any given DSLAM. Thus, oftentimes a CLEC's DSLAM was under-utilized.

According to the teachings of the invention, DSLAM 44 is shared by a number of service providers. Such sharing allows more than one service provider to provide DSL service using the same DSLAM. According to one embodiment of the invention, sharing of DSLAM 44 is effected through appropriate configuration of the DSLAM through line 65, granting control of various portions of DSLAM 44 to different service providers. Additional details of example embodiments of the invention are described in detail below with respect to FIGS. 2 through 4.

Figure 2:
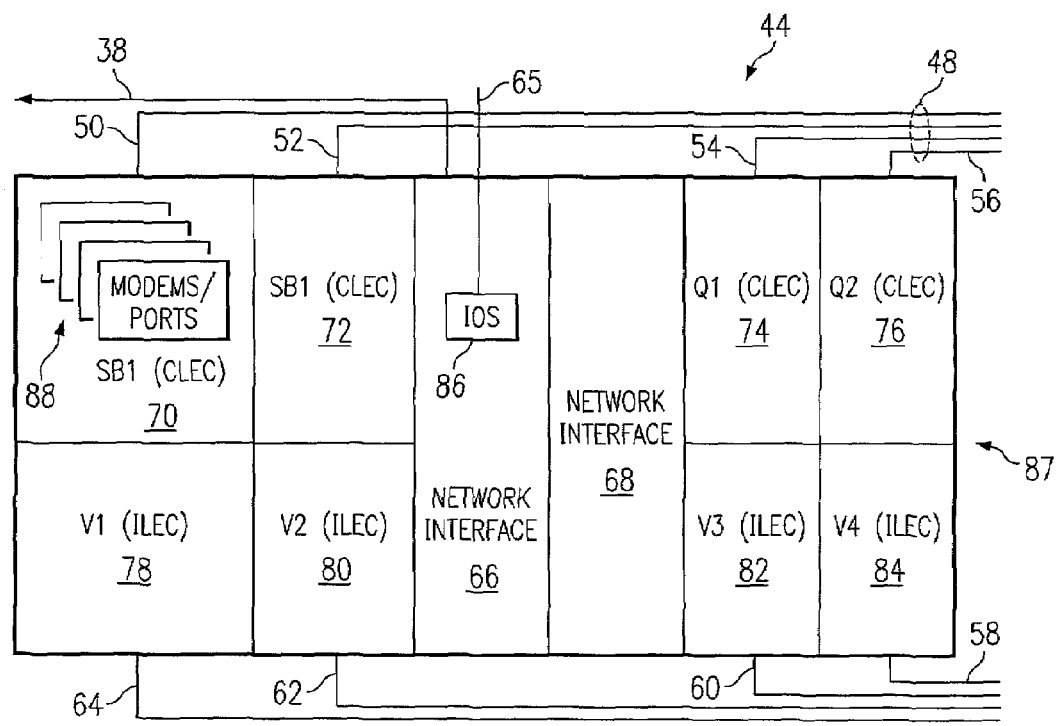
FIG. 2 is a block diagram of the digital subscriber line access multiplexer of FIG. 1.

FIG. 2 is a block diagram of DSLAM 44. DSLAM 44 comprises, in this example, a pair of network interface cards 66, 68, and a plurality of line cards 87. Network interface card 66 communicates with IP network 18 over line 38. Network interface 66 receives data from network 18 over line 38 and communicates it to a particular line card 87 associated with the intended destination of the data. Conversely, network interface 66 receives data from line cards 87 and communicates it over line 38 to IP/ATM network 18. The network interface card also contains the IP/ATM switch fabric which manages and processes the packets and cells. It also manages all aspects of the DSLAM, system health, system performance, switch health and performance, and network communications. Network interface card 66 includes an Internet operating system 86. Internet operating system 87 provides an operating system for control of the DSLAM 44. One example of Internet operating system 87 suitable for use with the present invention is IOS 12.2(DA)1, available from Cisco Systems.

Network interface card 68 may serve as a backup for network interface card 66. In some embodiments, network interface card 68 is omitted. Line cards 87 include, in this example, line cards 70 and 72, both associated with a CLEC, such as Southwestern Bell. Line cards 87 also include line cards 74 and 76, both associated with a different CLEC, such as Qwest. Line cards 87 also include line cards 78, 80, 82, and 84, all associated with an ILEC, which in this example, is Verizon. Thus, in this example, DSLAM 44 comprises four line cards associated with the incumbent local exchange carrier and two line cards for each competitive local exchange carrier.

Each of line cards 87 comprises one or more DSL modems 88, as illustrated with respect to line card 70. DSL modems 88 are often referred to as ports. Each of line cards 87 is designated as associated with a particular service provider because that service provider maintains control over ports on the line card. In this regard, control refers to being able to turn on and off service as well as to tune the particular type of service that a particular customer is granted, such as silver, platinum or gold service levels, depending on the amount of bandwidth provided to the customer. Division of control is illustrated on a line card-by-line card basis; however, division of control could also occur on a port-by-port basis, giving control of various ports on a line card to different service providers.

In the illustrated example, line card 70 couples to splitter 40 over line 50, line card 72 couples to splitter 40 over line 52, line card 74 couples to splitter 40 over line 54, and line card 36 couples to letter 40 over line 56. Line card 78 couples to splitter 40 over line 64, line card 80 couples to splitter 40 over line 62, line card 82 couples to splitter 40 over line 60, and line card 84 couples to splitter 40 over line 58. Line cards 87 each may comprise one or more ports, or modems 88 that receive data from a customer's home 14 and convert it into an appropriate digital format and perform any necessary modulation for transmission over the Internet. Conversely, modems 88 on line cards 87 receive digital information from the Internet through network interface 66 and appropriately demodulate it and convert it into analog form for transmission to a customer's home. Example details associated with configuring modems 88 or line cards 87 to be under the control of a specific ILEC or CLEC are described below in conjunction with FIGS. 3A through 4.

Figure 3A:
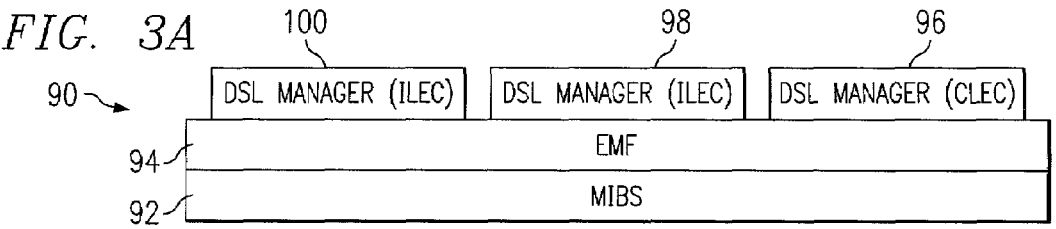
FIG. 3A is a logical diagram showing logical functions associated with configuring line cards of the digital subscriber line access multiplexer of FIG. 2.

FIG. 3A is a logical diagram showing components associated with configuration of various ports 88 or line cards 87 of DSLAM 44. FIG. 3A comprises an element manager framework 94, a MIBS 92, an ILEC DSL manager 96, and a plurality of CLEC DSL managers 98, 100. Element manager framework 94 provides the framework for configuring DSLAM 44. A suitable framework 94 for such configuration is available from Cisco Technologies under the name of Cisco ElementManager Framework. MIBS 92 refers to a collection of programs that implements the framework of the element manager framework 94. DSL managers 96, 98, and 100 provide a user interface to an appropriate service provider such that the service provider may appropriately set a particular port 88 on a line card 87 to desired settings. Examples of configuration data that are set are whether DSL service is provided, what level of service is provided, what data rate to the customer is provided, what signal transmission data is provided, and what is the health of the link.

As illustrated, there is a separate DSL manager 98, 100 for each separate CLEC and a separate DSL manager 96 for the ILEC. An example DSL manager 96 is available from Cisco Systems under the name of Cisco DSL Manager (CDM). DSL managers 96 and 98 may be found similarly to DSL manager 96, with modifications described below. Examples of implementations of the logical arrangement shown in FIG. 3A are described below in conjunction with FIGS. 3B through 4.

Figure 3B:
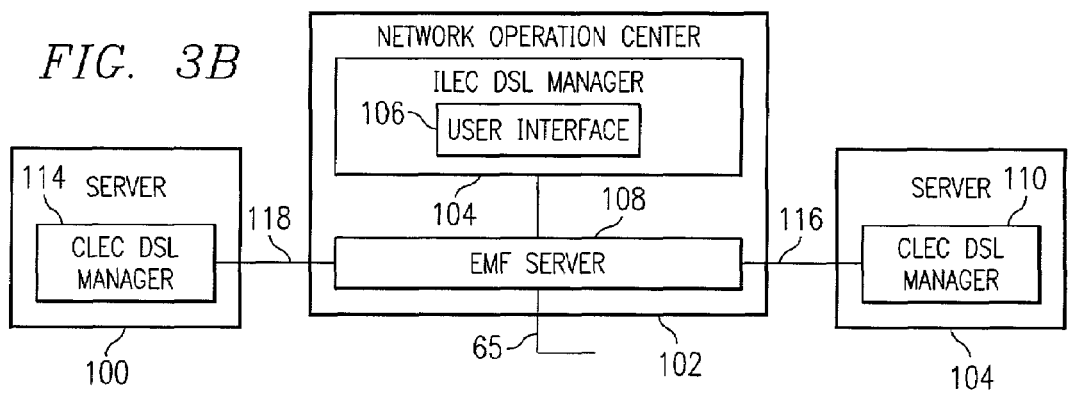
FIG. 3B is a block diagram of a system for configuring the DSLAM of FIG. 2 according to one embodiment of the invention.

FIG. 3B is a block diagram showing example details associated with a system for configuring line cards 87 or ports 88 thereof according to the teachings of the invention. The system illustrated in FIG. 3B comprises a network operations center 102 coupled to servers 104 and 106. Network operation center 102 operates to control configuration of ports in line cards 87 and the ports thereof 88 over line 65. Network operations center comprises an ILEC DSL manager 104 and an element manager framework server 108. ILEC DSL manager 104 provides a user interface 106 for communication with a user allowing easy viewing and setting of configuration data associated with line card 87 or ports thereof. ILEC DSL manager 104 may comprise any suitable computer executing appropriate functionality to perform such configuration. An example software package that provides such functionality is Cisco DSL Manager (CDM), available from Cisco Systems. Network operation center 102 also comprises an element manager framework server 108. Element manager framework server 108 executes commands received from DSL managers to configure modems or ports 88. Such commands are executed over line 65. Element manager framework server 108 may comprise a computer, such as a personal computer, that executes functionality for configuring modems 88. An example of such functionality is available from Cisco Systems in software form under the name of Cisco Element Manager Framework.

In this example, an ILEC controls its line cards 87 and associated ports 87 through ILEC DSL manager 104. The ILEC may communicate with ILEC DSL manager 104 through user interface 106. Commands associated with such control are implemented through element manager framework server 108 and communicated to DSLAM 44 over line 65. In this example, competitive local exchange carriers may configure their line cards 87 and associated ports 88 through a separate CLEC DSL manager 114, 110 operating on server 100, 104. CLEC DSL manager 110, 114 are substantially similar to ILEC DSL manager 104, except that they may operate to configure only line cards 87 and modems 88 associated with the CLEC. In contrast, ILEC DSL manager 104 may be set to only be able to configure line cards 87 or modems 88 associated with the ILEC, or alternatively, be able to configure all line cards 87 but defer configuration of competitors line cards and associated ports to the CLEC that has been designated to those line cards 87 or modems 88. In this example, CLEC DSL managers 114 communicates directly with element manager framework server 108 over line 118, and CLEC DSL manager communicates with element manager framework server 108 over line 116.

Thus, individual modems 88 and individual line cards 87 associated with a single DSLAM 44 may be configured by various service providers by allowing access to an element manager framework server through a plurality of DSL managers. Such configuring of the line cards 87 or ports 88 allows various service providers to share a common DSLAM 44, thus, reducing the cost of DSL service.

Figure 3C:
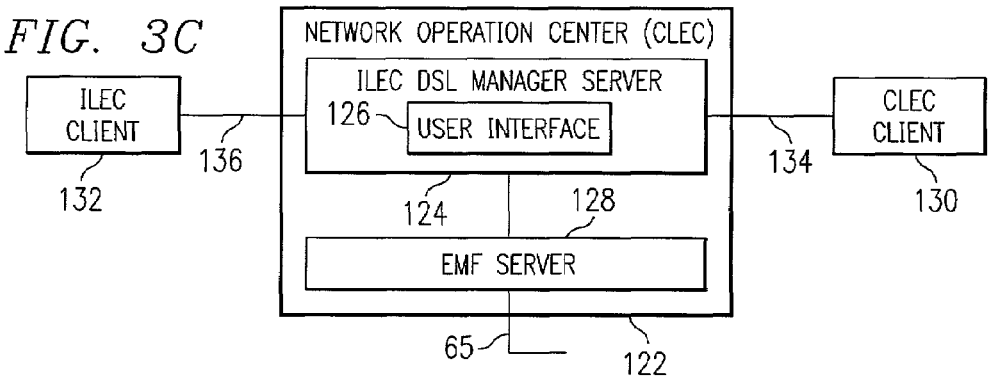
FIG. 3C is a block diagram of a system for configuring the DSLAM of FIG. 2 according to another embodiment of the invention.

FIG. 3C is a block diagram of yet another embodiment of a system for configuring DSLAM 44 according to the teachings of the invention. The system of FIG. 3C is substantially similar to the system of FIG. 3B except that instead of having a plurality of DSL managers, one for each service provider, a plurality of CLEC clients 130, 132 associated with an ILEC DSL manager 124 are provided. CLEC clients 130 and 132 are hosted by an ILEC DSL manager server 124 on an ILEC network operation center 122 and provide a user interface to the CLECs for configuration of line cards 87 or ports 88 that are associated with the respective CLEC. Because CLEC clients 130, 132 communicate directly with ILEC DSL manager server 124 permissions are set that grant access of CLEC clients 130, 132 to only particular line cards 87 or 88 over which the CLEC has control. The configuration data received by ILEC DSL manager server 124 is communicated to element manager server 128 and implemented over line 65.

Figure 4:
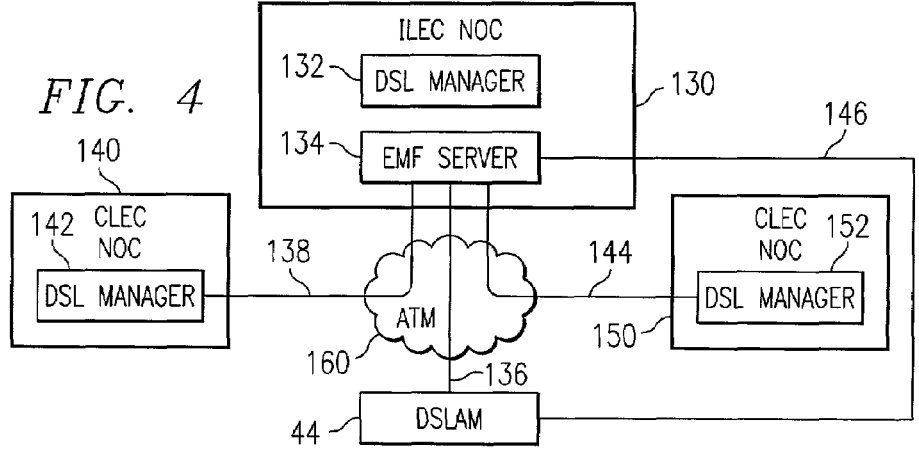
FIG. 4 is a block diagram showing additional details of FIG. 3B for configuring a DSLAM of FIG. 2 according to the teachings of the invention.

FIG. 4 is a system diagram showing one implementation of the systems of FIGS. 3A through 3C. The system of FIG. 4 includes an ILEC network operation center 130, a competitive local exchanger carrier network operation center 140, and a second competitive local exchange carrier network operation center 150. In this example, ILEC network operation center 130 includes a DSL manager 132 and a element manager framework 134. Each CLEC network operation center 140, 150 includes a DSL manager 142, 152, respectively. ILEC network operation center 130 may receive configuration data from CLEC network operation centers 140, 150 through an ATM cloud 160. In this example, DSL manager 142 associated with CLEC network operation center 140 receives configuration data at element manager framework server 134 over line 138 through ATM cloud 160. Element manager framework server 134 may be substantially similar to element manager framework serving 108 and 128. Such a path refers to an in-band configuration signal because it travels over the same network as the underlying data. Network operations center 150 provides configuration data through DSL manager 152 over in-band path 144 to element manager framework 134. In contrast, configuration data may be provided to ILEC network operations from 130 through out-of-band communication. An example of an out-of-band communication is communication of configuration data from element manager framework server 134 over line 146 to DSLAM 44. In this example, line 146 refers to a separate network, such as an Ethernet network for transmitting configuration data. In some examples, network interface 66 may include an Ethernet port through which outer-band traffic which configuration data may travel. Alternatively, configuration data may be provided from element manager framework 134 to DSLAM 44 through an in-band path 136, corresponding to line 65.

Although the present invention and its advantages have been described in detail, it should be understood that various changes, substitutions, and alterations can be made therein without departing from the spirit and scope of the present invention as defined by the appended claims.

What is claimed is:

1. A method of providing communications services comprising:
    proving a digital subscriber line access multiplexer having a plurality of line cards, each line card having one or more ports;
    granting control of a first subset of the ports to a first service provider;
    granting control of a second subset of the ports to a second service provider; and
    wherein a first one of the line cards comprises at least two ports and wherein granting control of a first subset of the ports to a first service provider comprises granting control of a first subset of the ports on the first one of the line cards and granting control of a second subset of the ports comprises granting control of a second subset of the ports on the first one of the line cards.

2. The method of claim 1, wherein granting control of a first subset of the ports to a first service provider comprises granting permission to the first service provider to access a network operation center associated with the digital subscriber line access multiplexer.

3. The method of claim 1, wherein granting control of a first subset of the ports to a first service provider comprises granting permission to the first service provider to access an element manager framework server associated with the digital subscriber line access multiplexer.

4. A method for providing communications services comprising;
    providing a digital subscriber line access multiplexer having a plurality of line cards, each line card having one or more ports;
    coupling a network operation center to the digital subscriber line access multiplexer;
    receiving at the network operation center from a first service provider configuration information regarding a first subset of the ports on a first one of the line cards and communicating, by the network operation center, the configuration information regarding the first subset of ports to the digital subscriber line access multiplexer;
    receiving at the network operation center from a second service provider configuration information regarding a second subset of the ports on the first one of the line cards; and
    communicating, by the network operation center, configuration information from the second service provider regarding the second subset of the ports to the digital subscriber line access multiplexer.

5. The method of claim 4, wherein receiving at the network operation center from a first service provider configuration information regarding a first subset of the ports comprises receiving configuration information through a user interface.

6. The method of claim 4, wherein receiving at the network operation center from a second service provider configuration information regarding a second subset of the ports comprises receiving configuration information at an element manager framework server in the network operation center.

7. The method of claim 4, wherein receiving at the network operation center from a second service provider configuration information regarding a second subset of the ports comprises receiving configuration information at an ILEC DSL manager server in the network operating center.

8. The method of claim 4, wherein communicating, by the network operation center, the configuration information from the second service provider regarding a second subset of the ports to the digital subscriber line access multiplexer comprises communicating the configuration information through an out-of-band network.

9. The method of claim 4, wherein communicating, by the network operation center, the configuration information from the second service provider regarding a second subset of the ports to the digital subscriber line access multiplexer comprises communicating the configuration information through an in-band network.

10. A digital subscriber line access multiplexer comprising:
    a network interface card;
    a plurality of line cards coupled to the network interface; the plurality of line cards including a first line card having first and second subsets of ports; and
    wherein the first subset of ports of the first line card is under the control of a first service provider and the second subset of ports is under the control of a second service provider.

11. The digital subscriber line access multiplexer of claim 10, and further comprising a configuration line coupling the digital subscriber line access multiplexer to a network operation center, the network operation center accessible by the first and second service providers.

12. The digital subscriber line access multiplexer of claim 10, wherein each line card comprises a plurality of modems coupled by respective copper pairs to subscribers of either the first, second, or another service provider.

13. A communications system comprising:
a digital subscriber line access multiplexer having a plurality of line cards, each line card having a plurality of ports;
a network operation center coupled to the digital subscriber line access multiplexer, the network operation center comprising:
  a digital subscriber line manager operable to provide a user interface to a first service provider to control a first subset of the ports, the digital subscriber line manager further operable to host one or more client interfaces each associated with a respective service provider, and receive configuration data from the respective service provider associated with a respective subset of the ports; and
  an element manager operable to receive configuration information from the digital subscriber line manager and configure the DSLAM based on the received configuration information; and
wherein the first subset of ports is coupled to a customer of the first service provider and a first one of the respective subsets of the ports is coupled to a second service provider the first subset of ports and the first one of the respective subsets of ports being on the same one of the plurality of line cards.

14. The system of claim 13, wherein the network operations center and the digital subscriber line access multiplexer reside in a telecommunications central office.

15. The system of claim 13, wherein the digital subscriber line access multiplexer communicates with the network operating center by out-of-band communications.

16. The system of claim 13, wherein the digital subscriber line access multiplexer communicates with the network operating center by in-band communications.

17. A communications system comprising:
a digital subscriber line access multiplexer having a plurality of line cards, each line card having a plurality of ports, a first subset of the ports associated with an incumbent local exchange carrier, and one or more additional subsets of the ports associated with one or more respective competitive local exchange carriers;
an incumbent local exchange carrier network operation center having:
  a digital subscriber line manager operable to provide a user interface to the incumbent local exchange carrier associated with the first subset of ports to receive configuration data, and further operable to provide data indicative of the received configuration data to an element manager; and
  the element manager coupled to the digital subscriber line access multiplexer, the element manager operable to control the plurality of ports in response to received configuration data;
one or more competitive digital subscriber line managers operable to provide a user interface to the respective competitive local exchange carrier and receive configuration data associated with the respective additional subsets of the ports, and further operable to provide the received configuration data associated with the respective additional subsets of the ports to the element manager; and
wherein the first subset of ports is coupled to a customer of the incumbent local exchange carrier and a first one of the one or more additional subsets of the ports is coupled to a customer of the one or more respective competitive local exchange carriers, the first subset of ports and the first one of the one or more additional subsets of ports being on the same one of the plurality of line cards.

18. The system of claim 17 wherein the incumbent local exchange carrier and the DSLAM both reside in a telecommunications central office.

19. A communications system comprising:
a digital subscriber access multiplexer having a plurality of line cards, each line card having a plurality of ports;
a means for allowing configuration of a first subset of the ports on a first one of the line cards by a first service provider;
a means for allowing configuration of a second subset of the ports on the first one of the line cards by a second service provider; and
wherein the first subset of ports are coupled to customers of the first service provider, and the second subset of ports are coupled to the customers of the second service provider.

* * * * *